(12) United States Patent
Carey et al.

(10) Patent No.: US 9,279,080 B2
(45) Date of Patent: Mar. 8, 2016

(54) MIXED HALIDE SCINTILLATORS

(71) Applicants: A. Andrew Carey, Lenoir City, TN (US); Peter Carl Cohen, Knoxville, TN (US); Mark S. Andreaco, Knoxville, TN (US)

(72) Inventors: A. Andrew Carey, Lenoir City, TN (US); Peter Carl Cohen, Knoxville, TN (US); Mark S. Andreaco, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 163 days.

(21) Appl. No.: 13/942,749

(22) Filed: Jul. 16, 2013

(65) Prior Publication Data

US 2014/0021410 A1   Jan. 23, 2014

Related U.S. Application Data

(60) Provisional application No. 61/673,487, filed on Jul. 19, 2012.

(51) Int. Cl.
*C09K 11/74* (2006.01)
*C09K 11/77* (2006.01)
*C01F 17/00* (2006.01)

(52) U.S. Cl.
CPC ......... *C09K 11/7772* (2013.01); *C09K 11/7428* (2013.01); *C09K 11/7704* (2013.01); *C09K 11/7719* (2013.01); *C09K 11/7731* (2013.01); *C01F 17/0056* (2013.01)

(58) Field of Classification Search
CPC .................................................. C01F 17/0056
USPC ............................ 252/301.4 H; 423/263, 491
See application file for complete search history.

(56) References Cited

U.S. PATENT DOCUMENTS 3,663,183 A * 5/1972 Dale ............................ 423/466
2008/0102011 A1* 5/2008 Moalem et al. ........... 423/240 R

FOREIGN PATENT DOCUMENTS

WO   WO 2010/132489   * 11/2010

OTHER PUBLICATIONS

Chemical Abstract citation 114:220026: Eliseev et al, "Synthesis and some physicochemical properties of dichlorofluorides of lanthanum and yttrium", Doklady Akademii Nauk Tadzhiksoi SSR (199), 33 (5), 320-3.*

* cited by examiner

*Primary Examiner* — Carol M Koslow
(74) *Attorney, Agent, or Firm* — Peter Kendall

(57) ABSTRACT

A mixed halide scintillator material including a fluoride is disclosed. The introduction of fluorine reduces the hygroscopicity of halide scintillator materials and facilitates tuning of scintillation properties of the materials.

1 Claim, No Drawings

MIXED HALIDE SCINTILLATORS

CROSS-REFERENCE TO RELATED APPLICATIONS

This application claims the benefit of U.S. Provisional Application Ser. No. 61/673,487, filed Jul. 19, 2012, which provisional application is incorporated herein by reference.

TECHNICAL FIELD

This disclosure relates to scintillator materials and particularly to metal halide scintillator materials. Certain arrangements also relate to specific compositions of such scintillator material and method of making the same.

BACKGROUND

Scintillator materials, which emit light pulses in response to impinging radiation, find a wide range of applications, including medical imaging, particle physics and geological exploration. While a variety scintillator materials have been made, there is a continuous need for superior scintillator materials.

SUMMARY

The present disclosure relates to halide scintillator materials that include two or halide anions, one of which is fluorine (F). The combination of fluorine and another halide results in a less hygroscopic scintillator material than a halide without fluorine.

Examples of halide scintillator materials with low-hygroscopicity include

DESCRIPTION

Cerium doped lanthanum bromide $LaBr_3$:Ce is an excellent scintillator with a significant flaw: It is hygroscopic. Hydrolysis produces oxyhalides, in this case LaOBr, which is a light scattering center. This property makes it extremely difficult to manufacture the raw materials with sufficient purity. Moreover, crystals of halide scintillators must be grown in a moisture-free environment without the presence of oxygen. The reaction of halides scintillators with moisture makes cutting, polishing, and long-term sealing of detector assemblies very difficult. The final assembly must be hermetically sealed for years.

Certain examples disclosed here in of the invention use two or more different halides in the same compound. Mixed halide anions can be used to tune the properties of the resulting scintillator. The hygroscopicity of halides materials can be reduced significantly.

For example, lanthanum fluoride ($LaF_3$) is not hygroscopic and is quite insoluble in water. This is because fluorine is more electronegative than oxygen and thus oxygen cannot displace fluorine. Oxygen is more electronegative than the other halides (Cl, Br, I), and these halides are therefore easily hydrolyzed. The result is that $LaF_3$ is not susceptible to hydrolysis. Thus, one can make stoichiometric compounds such as $LaFBr_2$ and $LaF_2Br$. The amount of fluorine can vary anywhere in the range of 0 to 3 and can make non-stoichiometric compounds.

In $LaBr_3$, it is quite easy to make lanthanum oxybromide (LaOBr) by reaction with a water molecule. That is, the bromide is easily hydrolysable. However, in $LaF_2Br$, the fluoride ion is not hydrolysable. The compound thus does not make the oxyhalide.

Typically, the metal cation coordinates with many anions, usually nine. Using fluoride to stabilize the hydrolysis, one can use the other halides in the remaining sites to optimize the properties for light output, decay time, density, energy resolution, and linearity.

Cerium represents interesting opportunities because it is self-activated. Cerium fluoride ($CeF_3$) has a low light output, about one-half BGO. Cerium bromide ($CeBr_3$) has a large light output of 68,000 photons/MeV. Cerium chloride is itself a good scintillator. Thus, one can use all four halides and fluoride to reduce hygroscopicity, and the others to optimize light output and decay time.

Iodine is very difficult to use as a scintillator. It typically makes the most soluble of the halides. It is also photochemically active because of the bond weakness. In the presence of oxygen and light, iodides react irreversible causing yellowing. A fluoride ion in the vicinity of an iodide could stabilize the photochemical activity of the iodide.

Bismuth halides are less hygroscopic than lanthanum halides. It is also a self-activated scintillator. Bismuth fluorohalides present another opportunity. The reduced hygroscopicity and the ability to be doped with cerium present advantages. Bismuth has the highest atomic number of the stable element.

This principle applies to any metal in the periodic table with a valence of two or greater. There is a fair amount of information on BaFCl:Eu, which is non-hygroscopic. BaFI:Eu is also non-hygroscopic, made by mixing $BaI_2$ in water (with europium iodide) and adding ammonium fluoride. This precipitates insoluble BaFI:Eu. This compound is ready for crystal growth and produces 55,000 photons/MeV.

More generally, a scintillator compound can be made by making a solution of a soluble metal halide and adding ammonium fluoride to the solution until precipitation occurs. This ensures the compound is not hygroscopic.

Thus, metal halide scintillation materials with improved moisture resistance, density and/or light output can be made with the addition of fluorine. Because many embodiments of the invention can be made without departing from the spirit and scope of the invent on, the invention resides in the claims hereinafter appended.

We claim:

1. A scintillator material, comprising a mixed halide of bismuth, comprising anions of fluorine and at least another halide.

* * * * *